(12) United States Patent
Raynor

(10) Patent No.: US 7,683,882 B2
(45) Date of Patent: Mar. 23, 2010

(54) COMPUTER MOUSE FOR AUTOMATING INPUT OPERATIONS

(75) Inventor: Jeff Raynor, Edinburgh (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 709 days.

(21) Appl. No.: 11/119,155

(22) Filed: Apr. 29, 2005

(65) Prior Publication Data
US 2005/0243065 A1    Nov. 3, 2005

(30) Foreign Application Priority Data
May 1, 2004   (EP)   ................. 04252579

(51) Int. Cl.
*G09G 5/08* (2006.01)
(52) U.S. Cl. ........................ 345/163; 463/37
(58) Field of Classification Search ............... 345/157, 345/160, 158, 163, 156, 162, 164, 165, 173; 710/67, 8, 13, 14, 18; 715/700, 701, 702, 715/740, 857, 858; 250/221, 227.24; 463/37
See application file for complete search history.

(56) References Cited

U.S. PATENT DOCUMENTS

| | | | |
|---|---|---|---|
| 4,964,075 A | 10/1990 | Shaver et al. | 364/900 |
| 5,144,548 A * | 9/1992 | Salandro | 700/9 |
| 5,214,785 A | 5/1993 | Fairweather | 395/800 |
| 5,958,055 A | 9/1999 | Evoy et al. | 713/310 |
| 2001/0035859 A1 | 11/2001 | Kiser et al. | 343/173 |

FOREIGN PATENT DOCUMENTS

| | | |
|---|---|---|
| EP | 0 303 020 | 2/1989 |
| EP | 0 508 685 | 10/1992 |
| JP | 2000047796 A * | 2/2000 |
| WO | 98/19292 | 5/1998 |

OTHER PUBLICATIONS

Patent Abstracts of Japan; "Personal Computer Operation Reproducing Device"; Feb. 18, 2000; Publication No. 2000047796; Application No. 10249039; pp. 1-15.

* cited by examiner

*Primary Examiner*—Abbas I Abdulselam
(74) *Attorney, Agent, or Firm*—Lisa K. Jorgenson; Allen, Dyer, Doppelt, Milbrath & Gilchrist, P.A.

(57) ABSTRACT

A computer navigation device includes a movement sensor and a trigger device activated by a timer. The computer navigation device periodically transmits to a host computer a pre-defined signal corresponding with the signal that would otherwise be generated by the movement sensor on detection of specific movements of the computer navigation device.

6 Claims, 3 Drawing Sheets

COMPUTER MOUSE FOR AUTOMATING INPUT OPERATIONS

FIELD OF THE INVENTION

The present invention relates to a peripheral device for a computer and in particular a computer navigation device.

BACKGROUND OF THE INVENTION

Software tools for preventing the automatic shutdown of a computer (or removal of a user's access to a computer network) in the absence of user activity therewith are well known. However, these software tools are subject to software failure and are designed to operate upon specific software platforms (e.g. MSWindows and Linux). Consequently, existing software tools for preventing the automatic shutdown of a computer system are typically inflexible and incapable of operation upon multiple software platforms.

A mouse is a well-known computer peripheral device. More specifically, a mouse is an input device to a host computer wherein the mouse is physically movable by a user to provide access to desired software features on the host computer. In use, movement of the mouse is detected by an on-board sensor (e.g. an infrared sensor) and the resulting sensor signal is transmitted to the host computer through a USB or PS2 port. Alternatively, the sensor signal may be transmitted to the host computer using a wireless technology such as Bluetooth. The format of the data transmitted by the mouse is typically standardized in accordance with protocols for a "Human Interface Device". On receipt of a signal indicating movement of the mouse, the host computer's operating system moves a cursor on the host-computer's screen.

In addition with the above navigational functionality, a mouse is also typically provided with buttons which when pressed by the user typically activate a required program or software feature. While mice are manufactured with increasingly sophisticated on-board technologies (e.g. optical mice are provided with image processing features to facilitate image analysis), the output data from a mouse is nonetheless exclusively determined by a user's immediate input to the mouse (i.e. movement of the mouse or depression of a button).

While some operating systems (e.g. Windows 3.1) have facilities to record and replay keyboard and mouse movement sequences these facilities are typically dependent upon the specific operating system of the host-computer. Furthermore, the record and replay facility may be disabled to prevent virus activity and in many cases may not be easily reactivated by the user.

Some operating systems incorporate software to schedule programs at certain times, but these task scheduling software systems typically suffer from a number of limitations. For example, the CPU overhead of implementing task scheduling software typically slows the operation of a host computer. Furthermore, the task scheduling software may not be implemented or may be disabled on a host-computer. Finally, existing task scheduling software systems may not operate with programs requiring human interaction (e.g. games etc.). Consequently, existing task scheduling software systems may be unreliable insofar as they fail to carry out a required operation.

SUMMARY OF THE INVENTION

According to the invention there is provided a computer navigation device comprising a movement sensor or sensing means and a trigger or triggering means activated by a timer or timing means to periodically transmit to a host computer a pre-defined signal corresponding with the signal that would otherwise be generated by the movement sensing means on detection of specific movements of the computer navigation device.

According to a second aspect of the invention there is provided a computer navigation device comprising a movement sensor or sensing means, an at least one first user-selectable element, a storage device or means and a transmitter or transmission means, wherein movement of the computer navigation device detected by the movement sensing means and selection of the at least one first user-selectable element is storable in the storage means and retrievable from the storage means at a later date for transmission by the transmission means to a host computer.

Preferably, the computer navigation device is further provided with a trigger or triggering means connectable to the storage means to trigger the retrieval of previously stored movements of the computer navigation device and selections of the at least one first user-selectable element from the storage means. Preferably, the triggering means is activatable by a user. Optionally, the trigger or triggering means may be activatable by a timer or timing means at a predefined time. The computer navigation device may be provided with at least one second user-selectable element wherein the selection of the at least one second user-selectable element activates storage of detected movements of the computer navigation device and selections of the at least one first user-selectable element.

According to a third aspect of the invention there is provided a method of automating mouse-facilitated tasks comprising storing at least one of mouse movements and mouse button depressions in a storage device or means; triggering the retrieval of the stored mouse movements and/or mouse button depressions from the storage means; and transmitting a signal to a host computer, the signal corresponding with the retrieved mouse movements and/or mouse button depressions.

Preferably, the step of triggering the retrieval of the stored mouse movements and mouse button depressions from the storage means is activated by a user. Desirably, the step of triggering the retrieval of the stored mouse movements and mouse button depressions from the storage means is activated by at least one predefined time by a timer or timing means.

The first embodiment of the present invention provides a mechanism for providing a periodic signal to a host computer in the absence of a user input thereto to prevent the shutdown of software operating on the host computer. Consequently, the first embodiment of the present invention prevents or substantially reduces the performance of automatic shutdown tasks typically performed by a host computer in the absence of user interaction therewith.

In contrast with traditional task scheduling software systems the fourth embodiment of the present invention is a small self-contained unit where the correct operation of a simple task (comprising the issuance of a sequence of commands at a specified time) is more easily verified.

BRIEF DESCRIPTION OF THE DRAWINGS

Three embodiments of the invention will now be described by way of example only with reference to the accompanying drawings in which.

DETAILED DESCRIPTION OF THE PREFERRED EMBODIMENTS

Figure 1:
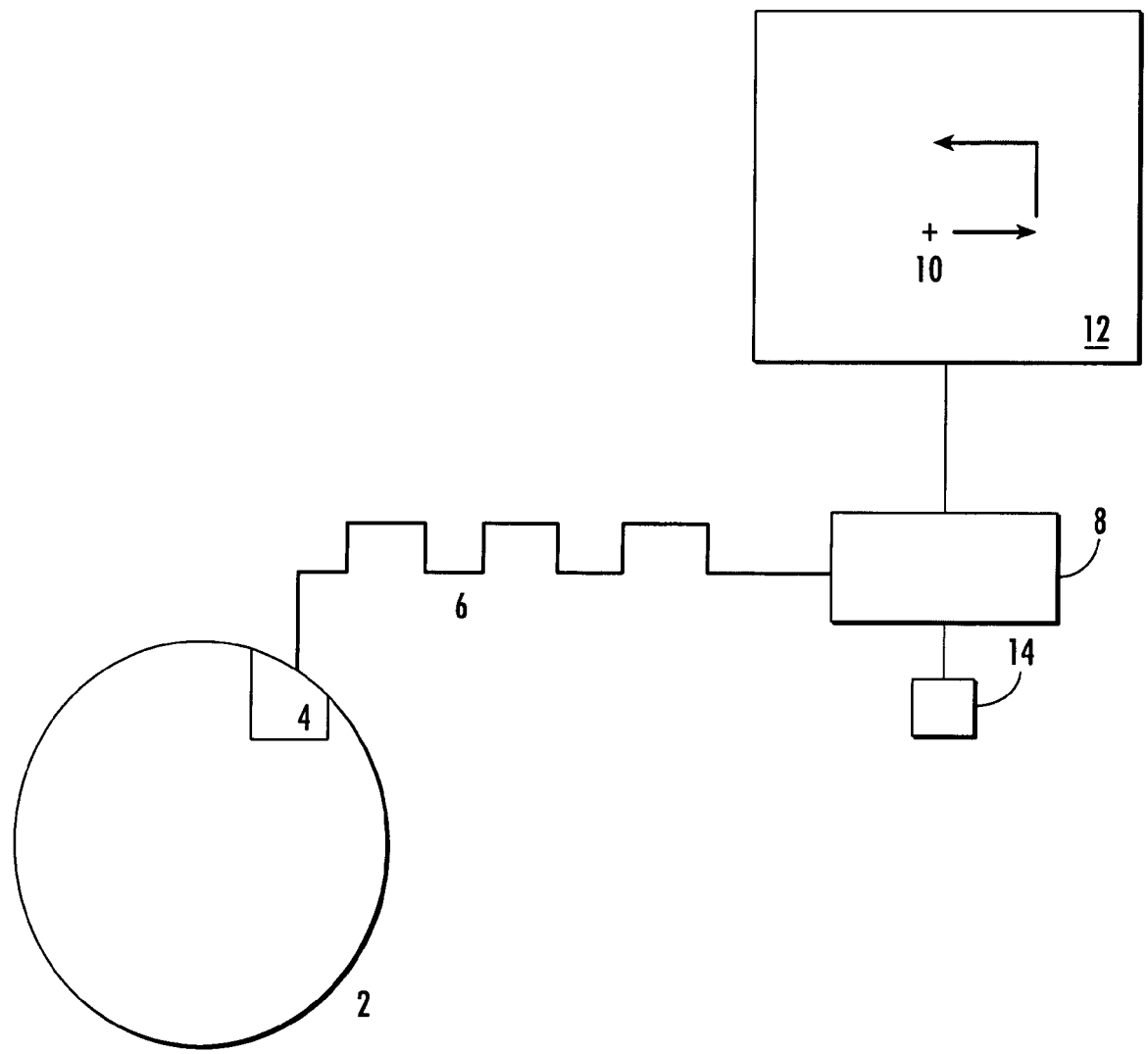
FIG. 1 is a schematic diagram illustrating the operation of the first embodiment of the computer navigation device.

For the sake of clarity, the computer navigation device of the present invention will be referred to in the following description as an enhanced mouse. Referring initially to FIG. 1, in a first embodiment of the present invention, the enhanced mouse 2 is provided with at least one button 4. The depression of the button 4 (or the repeated depression of the button 4 in a pre-defined sequence) causes the enhanced mouse 2 to emit a periodic signal 6 to a host computer 8.

The periodic signal 6 mimics the signal emitted from a conventional mouse when moved by a user. Accordingly, the transmitted signal 6 causes the host computer 8 to move a cursor 10 on the host computer screen 12 in a pre-determined fashion (e.g. five units right followed by five units left). The movement of the on-screen cursor 10 provides an indication to the host computer's operating system 14 that the host computer 12 is in use and should not be shutdown, disconnected or logged out from a network (not shown).

While the movement of an on-screen cursor will usually be sufficient to prevent an operating system from shutting down, it may not prevent an application from automatically logging off a computer network. Instead, the activation of an on-screen menu may be required in addition to (or instead of) the movement of an on-screen cursor to prevent the application from automatically logging off a computer network.

As will be recalled from the earlier discussion of conventional mouse devices, an on-screen menu element is typically activated by the depression of a button on a conventional mouse. Accordingly, the enhanced mouse in the second embodiment of the present invention prevents an application from automatically logging off a network by emitting a signal that mimics the signal emitted by a traditional mouse in response to the depression of a button.

To prevent the host computer from performing an unintended task, the periodic signal emitted from the enhanced mouse may also be adapted to cause the host computer to activate a specific menu without performing a further action. Furthermore, the periodic signal emitted by the enhanced mouse may also mimic the signal emitted by a traditional mouse when moved by a user (i.e. as described in relation to the first embodiment of the present invention).

The first embodiment of the enhanced mouse transmitted periodic signals to a host computer that mimicked the signal transmitted by a traditional mouse in response to movements thereof by a user. The second embodiment of the enhanced mouse also transmitted signals that mimicked the signals transmitted by a traditional mouse in response to the depression of a specific button thereon.

Many repetitive user tasks comprise interactions with a host computer that may be described by a sequence of mouse movements and mouse button depressions. Accordingly, it is possible to use the approach employed in the first and second embodiments of the present invention to provide a mechanism for automating many such repetitive user tasks. Take for example the task of starting an application. When using a traditional mouse, the task could typically involve the following steps:

(a) moving an on-screen cursor to the bottom right of the host-computer's screen;
(b) activating an on-screen menu;
(c) moving the on-screen cursor upwards by a pre-defined number of pixels ($Mov_A$);
(d) activating an on-screen menu element ($Click_A$);
(e) moving the on-screen cursor to the right by a pre-defined number of pixels ($Mov_B$);
(f) activating an on-screen menu element ($Click_B$);
(g) moving the on-screen cursor to the right by a pre-defined number of pixels and downwards by a predefined number of pixels ($Mov_C$); and
(h) activating an on-screen element ($Click_C$).

Figure 2:
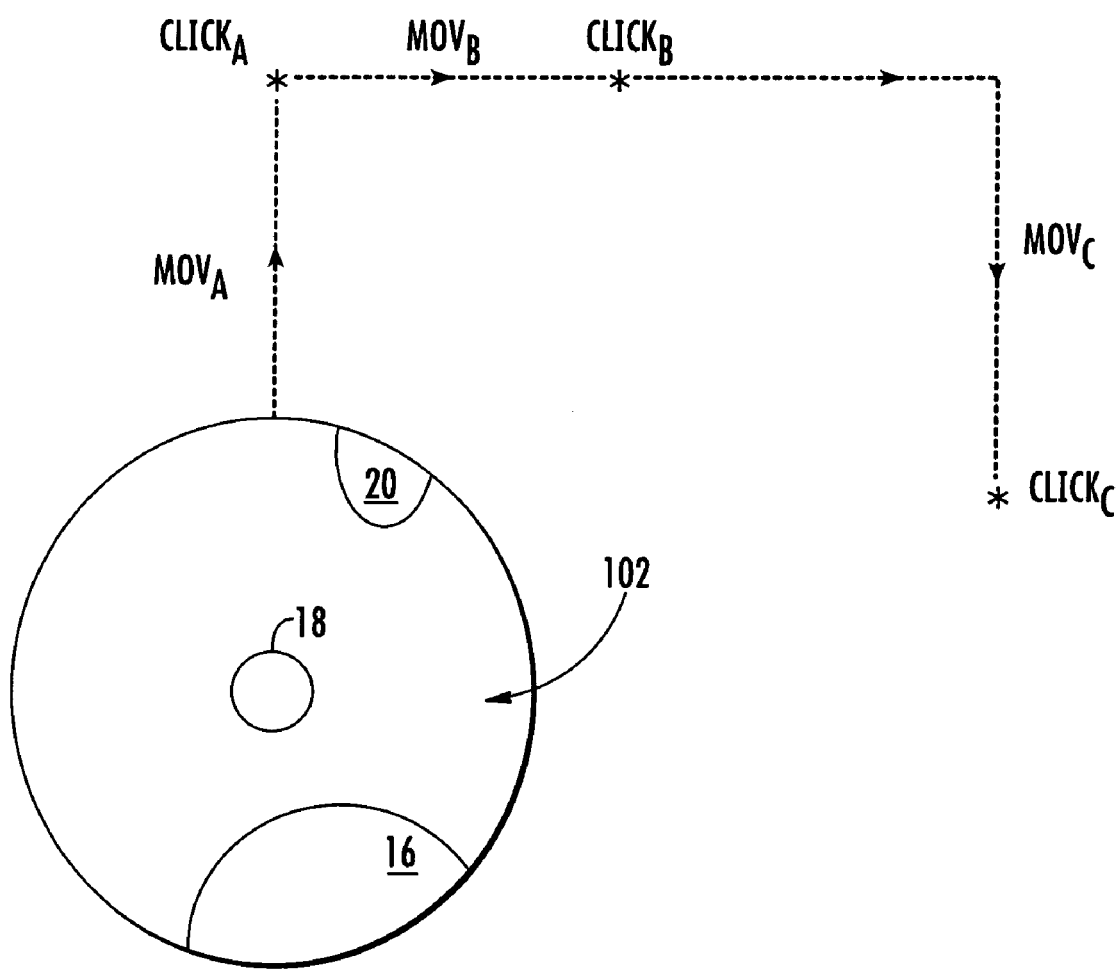
FIG. 2 is a schematic diagram illustrating the operation of the third embodiment of the computer navigation device.

Referring to FIG. 2, the third embodiment of the enhanced mouse 102 comprises an on-board (preferably non-volatile) memory 16, a sensor 18 (as in a conventional mouse) and at least one button 20 specifically dedicated to the storage and/or performance of repetitive user tasks. In use of the enhanced mouse 102, a desired sequence of mouse operations (e.g. mouse movements $Mov_A$, $Mov_B$ and/or mouse button depressions $Click_A$, $Click_B$) are stored in the on-board memory 16 by moving the enhanced mouse 102 over a desired path and clicking as required.

Once the required sequence of mouse operations has been stored in the enhanced mouse's on-board memory 16 as a macro the macro can be activated by the user by pressing the specifically dedicated button 20 or pressing button(s) 20 in a pre-defined sequence. This will cause the enhanced mouse 102 to retrieve the mouse operations stored in the on-board memory 16 and transmit signals to the host computer corresponding with the retrieved mouse operations.

To establish a fixed absolute starting position for the on-screen cursor, the user must move the enhanced mouse 102 so that the on-screen cursor is moved to one corner of the screen (beyond which the cursor cannot be further moved).

The third embodiment of the present invention provides an enhanced mouse capable of causing a host computer to start an application with minimal human intervention (a single mouse press). This facility is an extension of a timed activation facility. With a timed activation facility, a user can cause an enhanced mouse to store a macro (comprising a sequence of mouse movements and mouse button depressions) using the procedure previously described for the third embodiment. However, instead of the macro being activated in response to a specific user demand as employed in the third embodiment, the enhanced mouse could be programmed to automatically activate the macro at a specific time.

Figure 3:
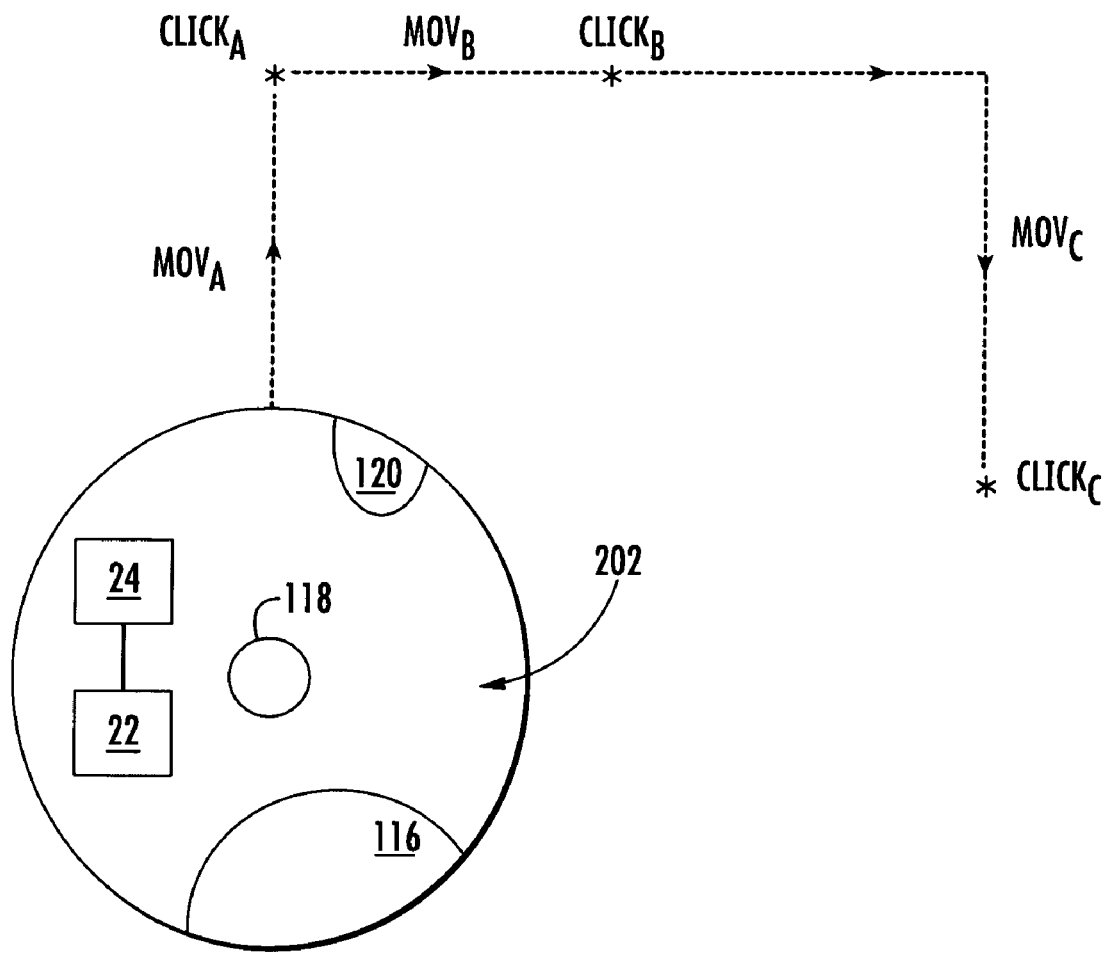
FIG. 3 is a schematic diagram illustrating the operation of the fourth embodiment of the computer navigation device.

Accordingly, referring to FIG. 3 the fourth embodiment of the present invention comprises an enhanced mouse 202 with an on-board (preferably non-volatile) memory 116, a sensor 118, at least one button 120 specifically dedicated to the storage of repetitive user tasks. The fourth embodiment of the present invention further comprises a real time clock 22 to determine the time and trigger events (via an alarm mechanism) for activating a stored macro.

Finally, the fourth embodiment of the present invention includes a mechanism 24 for setting the real time clock and alarm events. The real time clock could be set by a number of mechanisms including:
(a) dedicated switches;
(b) "graffiti"/gesture recognition, wherein a user presses a button to enter the system software into a set mode and then draws the time with the mouse, the mouse then uses in-built μP/software to recognize the drawn numbers;
(c) analog clock drawing, wherein a user draws the time as on an analog clock;
(d) a mouse-pad for an optical mouse that has areas with
  (i) patterns/textures corresponding to different numerals (for example black=0, white=9 (intensity modulated);
  (ii) fine pitch (dots spaced at 100 mm)=0 and coarse pitch (dots spaced at 1100 mm)=9;

(iii) combination of intensity, contrast and pitch, e.g. 4 different shades of grey combined with 4 different dot-spacing gives 16 different possibilities.

There are similarly a number of options for enabling the enhanced mouse to confirm the time or provide some other user feedback, including:
 (a) a low-cost audio signaling device;
 (b) a flashing LED;
 (c) a numeric LED (so the enhanced mouse could also be used as a clock)
 (d) outputting the time as a sequence of cursor movements and button presses (for example by actually drawing the numbers on the screen wherein the user would preferably start a simple drawing program, e.g. paint, XFig etc. and the text would be drawn on the screen by the mouse).

The timed activation technique could be extended to store several macros and issue them at different times or time intervals. For example, a user could program a sequence to start an application (for example start an audio recording program) at 19:00 and another sequence (end recording) at 19:15. The host computer would then carry out this action, unattended, at the specified times.

Modifications and alterations may be made to the above without departing from the scope of the invention.

The invention claimed is:

1. A computer mouse for use with a host computer, the computer mouse comprising:
 a movement sensor to detect movement of the computer mouse and generate a corresponding movement sensor signal to the host computer;
 a mouse button operable by a user to generate a corresponding button activation signal to the host computer;
 a memory to store respective sequences of movement sensor signals and button activation signals as macros;
 a trigger to retrieve a respective macro from the memory and transmit to the host computer a triggering signal that corresponds to the stored sequence of movement sensor signals and button activation signals from the memory; and
 a programmable timer to automatically activate the trigger to start respective macros at different starting times.

2. A computer mouse for use with a host computer, the computer mouse comprising:
 a movement sensor to detect movement of the computer mouse;
 at least one first user-selection element;
 a memory to store detected movement of the computer mouse and selection of the at least one first user-selection element as respective sequences of mouse operations which are storable in the memory and retrievable therefrom for transmission to the host computer as macros;
 a trigger associated with the memory to trigger the retrieval of a respective macro stored therein for transmission of the sequences of mouse operations to the host computer; and
 a programmable timer to automatically activate the trigger to start respective macros at different starting times.

3. A computer mouse as claimed in claim 2 wherein the at least one first user-selection element comprises a mouse button.

4. A computer mouse as claimed in claim 3 further comprising a timer setting unit to set the different starting times.

5. A computer mouse as claimed in claim 2 further comprising at least one second user-selection element to activate storage of mouse operations.

6. A method of automating mouse-facilitated tasks for use with a host computer, the method comprising:
 storing respective sequences of mouse operations, defined as at least one of mouse movements and mouse button depressions, in a memory as macros;
 triggering the retrieval of the stored macros from the memory; and
 transmitting a signal, corresponding to the retrieved sequences of mouse operations, to the host computer;
 programming a programmable timer with different starting times for the respective macros;
 wherein triggering the retrieval of the stored macros from the memory is activated by the programmable timer at the different starting times.

* * * * *